United States Patent
Dixon et al.

(10) Patent No.: US 9,588,827 B2
(45) Date of Patent: Mar. 7, 2017

(54) SINGLE PROGRAM CALL MESSAGE RETRIEVAL

(75) Inventors: Bret W. Dixon, South Perth (AU); Alexander S. Ross, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1409 days.

(21) Appl. No.: 12/035,431

(22) Filed: Feb. 21, 2008

(65) Prior Publication Data

US 2009/0217294 A1    Aug. 27, 2009

(51) Int. Cl.
*G06F 3/00* (2006.01)
*G06F 9/54* (2006.01)

(52) U.S. Cl.
CPC ........ *G06F 9/546* (2013.01); *G06F 2209/548* (2013.01)

(58) Field of Classification Search
CPC ..................................... G06F 9/546
USPC ........................ 719/328, 339, 314
See application file for complete search history.

(56) References Cited

U.S. PATENT DOCUMENTS

| | | | | |
|---|---|---|---|---|
| 6,714,952 B2 * | 3/2004 | Dunham et al. | ............. | 707/645 |
| 7,047,532 B1 * | 5/2006 | Connelly | ............. | G06F 9/546 719/310 |
| 7,240,089 B2 * | 7/2007 | Boudreau | ............. | G06F 9/546 709/203 |
| 2006/0056413 A1 | 3/2006 | Ikeda et al. | | |
| 2006/0161733 A1 * | 7/2006 | Beckett | ............. | G06F 13/4059 711/118 |
| 2008/0147861 A1 * | 6/2008 | Oishi | ............. | G06F 21/64 709/225 |

OTHER PUBLICATIONS

Stefan, Sockets++: A Uniform Application Programming Interface for Basic-Level Communication Services, 1996.*

* cited by examiner

*Primary Examiner* — Lechi Truong
(74) *Attorney, Agent, or Firm* — Steven M. Greenberg, Esq.; CRGO Law

(57) ABSTRACT

Embodiments of the present invention provide a method, system and computer program product for single program code message retrieval for message queues. In an embodiment of the invention, a message queue data processing system can be configured for single program code message retrieval for message queues. The system can include a message queue executing in a host server and providing an API to applications communicatively coupled to the message queue over a computer communications network. The API exposed by the message queue can include a single program call including program code enabled to open a queuing resource in the message queue, to retrieve all messages in a message buffer from the queuing resource and to close the queuing resource.

6 Claims, 1 Drawing Sheet

SINGLE PROGRAM CALL MESSAGE RETRIEVAL

BACKGROUND OF THE INVENTION

Field of the Invention

The present invention relates to the field of message queues and more particularly to message retrieval from message queues.

Description of the Related Art

In the field of information technology, a message queue is a software-engineering component used for inter-process communications or inter-thread communications. The component employs a queue into which messages can be placed by a messenger and from which messages can be retrieved by a designated recipient. In this regard, the message queue can be a communicative component enabling asynchronous messaging as between the messenger and the designated recipient. Operationally, the message queue can support multiple messengers and recipients such that asynchronous communications can be achieved for a group of participants.

The asynchronous nature of the message queue provides for an ideal technology coupler for disparate technologies. Specifically, so long as separate technologies can access the message queue, the separate and disparate technologies can engage in message passing thereby enabling communications. In particular, the message queue can expose different method calls through an application programming interface (API) for opening, writing to, reading from, and closing the message queue. Each application in turn can include logic to invoke a sequence of the method calls in order to either place a message into the message queue, or to retrieve a message from the message queue.

Accessing a message queue often requires the invocation of a sequence of message queue method calls. A typical sequence includes:
 OPEN (q_handle, queuing_resource)
 WRITE (q_handle, message_buffer)
 CLOSE (q_handle)
For message writing operations, it can be inefficient to invoke three separate method calls in the message queue API. Accordingly, it is known to combine the three method calls into a single method call exposed by the message queue API. For instance, the single method call can include WRITE (queuing_resource, message_buffer).

For message writing to the message queue, it makes sense to consolidate the three method calls into a single method call for the message queue. Specifically, generally writing to the message queue requires a single write operation wrapped by the opening and closing of the message queue. The same is not true in consideration of retrieving messages from a message queue. Rather, in most cases the message queue is to be opened and a sequence of message retrieval operations are invoked before closing the message queue. To consolidate the sequence into a single operation would require the repeated invocation of the operation to accommodate multiple different message retrieval requests. As such, at present message queues do not provide a single method call to retrieve a message from the message queue. Accordingly, for granular message retrieval requests for a single instance of message data, three method calls to the message queue API are required.

BRIEF SUMMARY OF THE INVENTION

Embodiments of the present invention address deficiencies of the art in respect to message queue management and provide a novel and non-obvious method, system and computer program product for single program code message retrieval for message queues. In an embodiment of the invention, a message queue data processing system can be configured for single program code message retrieval for message queues. The system can include a message queue residing on a host server and providing an API to applications communicatively coupled to the message queue over a computer communications network, or to applications locally coupled to the message queuing system.

The API exposed by the message queue system can include a single program call including program code enabled to open a queuing resource in the message queue, to retrieve all messages in a message buffer from the queuing resource and to close the queuing resource. The API further can expose separate program calls, each individually and respectively being enabled to open a queuing resource in the message queue, to retrieve a message buffer from the queuing resource and to close the queuing resource.

In another embodiment of the invention, a method for single program code message retrieval for message queues can be provided. The method can include receiving a single program call in a message queue from an invoking computing process over a computer communications network, opening a queuing resource, retrieving all messages in a message buffer from the queuing resource and closing the queuing resource all in response to receiving the single program call in the message queue, and returning the message buffer to the invoking computing process over the computer communications network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for single program code message retrieval for message queues. In accordance with an embodiment of the present invention, a single interface call can be provided in an application programming interface (API) for a message queue to permit the opening of a queuing resource, the retrieval of a message from the queuing resource and the closing of the queuing resource. In this way, an external client can retrieve a message without burdensomely invoking three separate API calls on the message queue. In addition, the client does not reserve computer resources that are allocated and held until the queuing resource is closed other then for the duration of the call.

Figure 1:
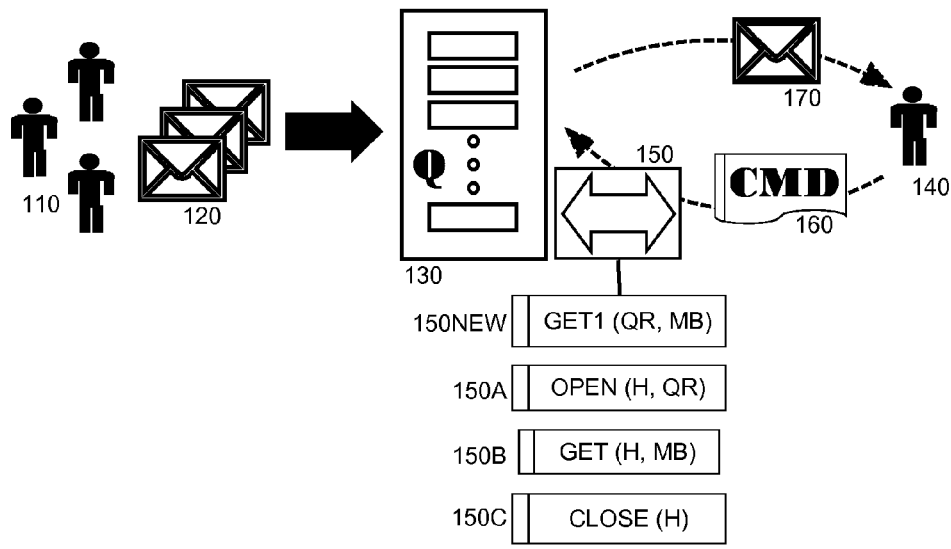
FIG. 1 is a pictorial illustration of a process for single program code message retrieval for message queues.

In further illustration, FIG. 1 pictorially depicts a process for single program code message retrieval for message queues. As shown in FIG. 1, a message queue 130 can be provided to queue one or more messages 120 received from message senders 110. A message queue API 150 further can be provided for the message queue 130. The message queue API 150 can include program calls 150A, 150B, 150C for opening a queuing resource by handle, retrieving a message from an open message queuing resource, and closing a queuing resource by handle. Notably, the API 150 separately can provide a single program call 150NEW.

The single program call 150NEW can include program code enabled to sequentially open a queuing resource by handle, to retrieve a message buffer by the same handle, and to close the queuing resource by handle. In operation, a requester 140 communicatively coupled to the message queue 130 can issue a command 160 to the API 150 to invoke the single program call 150NEW to retrieve a message 170 from the message queue without being required to issue separate commands to open a queuing resource, to retrieve a message buffer from the queuing resource, and to close the queuing resource.

Figure 2:
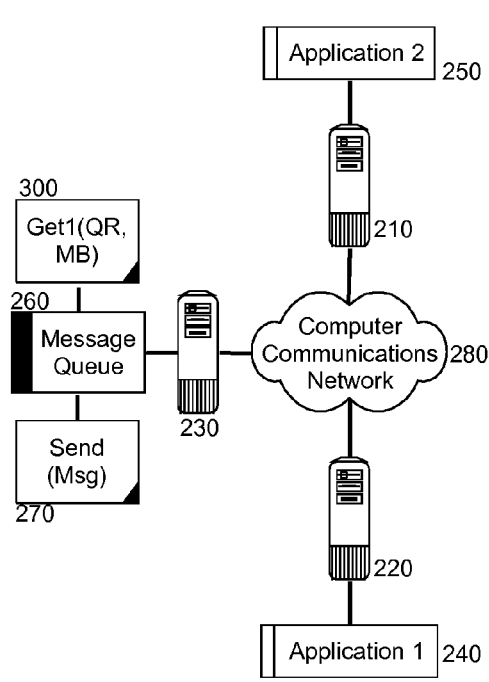
FIG. 2 is a schematic illustration of a message queue data processing system configured for single program code message retrieval for message queues; and, FIG. 3 is a flow chart illustrating a process for single program code message retrieval for message queues.

The process shown in FIG. 1 can be implemented in a message queuing data processing system. In further illustration, FIG. 2 schematically shows a message queue data processing system configured for single program code message retrieval for message queues. The system can include different servers 210, 220, each hosting a different application 240, 250. Each of the servers 210, 220 can be configured for communicative coupling over computer communications network 280 to a message queue 260 executing in host server 230. The message queue can include at least two program calls 270, 300 exposed through an API.

A first program call 270 can include a send functionality by which a message can be inserted by a first application 240 into the message queue 260. The second, single program call 300 can include a retrieve functionality by which a message in the message queue 260 can be retrieved. In this regard, the second, single program call 300 can include program code enabled to permit the opening of a queuing resource in the message queue 260, to retrieve a message from the queuing resource in the message queue 260, and to close the queuing resource in the message queue 260.

Figure 3:
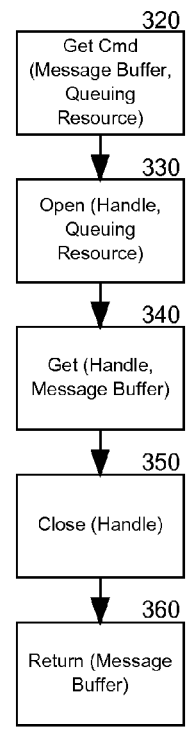

In yet further illustration, FIG. 3 is a flow chart illustrating a process for single program code message retrieval for message queues. The process can begin in response to a single invocation of a program call by a calling process to an API to a message queue. In block 320 a command can be received specifying each of a message buffer and a queuing resource. Thereafter, in block 330, the specified queuing resource can be opened and associated with the handle and in block 340, a message buffer can be retrieved from the open queuing resource. Finally, in block 350 the queuing resource can be released by reference to the handle and in block 360 the message buffer can be returned to the calling process.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A message queue data processing system configured for single program code message retrieval for message queues, the system comprising:
    a host server with memory and at least one processor;
    a message queue executing in the memory of the host server and providing an application programming interface to applications communicatively coupled to the message queue over a computer communications network; and,
    an application programming interface (API) provided by the message queue and included as part of the message queue, the API comprising a single program call included as part of the message queue and comprising program code enabled to open a queuing resource in the message queue, to retrieve all messages in a message buffer from the queuing resource and to close the queuing resource.

2. The system of claim 1, wherein the API further exposes a separate program call enabled to open a queuing resource in the message queue.

3. The system of claim 1, wherein the API further exposes a separate program call enabled to retrieve a message buffer from the queuing resource.

4. The system of claim 1, wherein the API further exposes a separate program call enabled to close the queuing resource.

5. A method for single program code message retrieval for message queues, the method comprising:

receiving a single program call in a message queue in memory of a computer from an invoking computing process over a computer communications network, the message queue comprising an application programming interface (API) provided by the message queue and included as part of the message queue and comprising the single program call included as part of the message queue and comprising program code enabled to open a queuing resource in the message queue, to retrieve all messages in a message buffer from the queuing resource and to close the queuing resource;

in response to receiving the single program call, opening the queuing resource, retrieving all messages in the message buffer from the queuing resource and closing the queuing resource; and, returning the message buffer to the invoking computing process over the computer communications network.

6. A computer program product comprising a non-transitory computer usable storage memory device storing computer usable program code for single program code message retrieval for message queues, the computer program product comprising:

computer usable program code for receiving a single program call in a message queue from an invoking computing process over a computer communications network, the message queue comprising an application programming interface (API) provided by the message queue and included as part of the message queue and comprising the single program call included as part of the message queue and comprising program code enabled to open a queuing resource in the message queue, to retrieve all messages in a message buffer from the queuing resource and to close the queuing resource;

computer usable program code for, in response to receiving the single program call, opening the queuing resource, retrieving all messages in the message buffer from the queuing resource and closing the queuing resource; and, computer usable program code for returning the message buffer to the invoking computing process over the computer communications network.

* * * * *